United States Patent
Netzer

(10) Patent No.: US 12,186,814 B2
(45) Date of Patent: Jan. 7, 2025

(54) MILLING TOOL FOR MILLING WORKPIECES

(71) Applicant: HPTEC GmbH, Ravensburg (DE)

(72) Inventor: Stefan Netzer, Wolfegg (DE)

(73) Assignee: HPTEC GmbH, Ravensburg (DE)

(*) Notice: Subject to any disclaimer, the term of this patent is extended or adjusted under 35 U.S.C. 154(b) by 545 days.

(21) Appl. No.: 17/495,142

(22) Filed: Oct. 6, 2021

(65) Prior Publication Data

US 2022/0055126 A1 Feb. 24, 2022

Related U.S. Application Data

(63) Continuation of application No. PCT/EP2020/060101, filed on Apr. 8, 2020.

(30) Foreign Application Priority Data

Apr. 12, 2019 (EP) .................................. 19168891

(51) Int. Cl.
 *B23C 5/10* (2006.01)
(52) U.S. Cl.
 CPC ........ *B23C 5/10* (2013.01); *B23C 2210/0492* (2013.01); *B23C 2226/27* (2013.01)
(58) Field of Classification Search
 CPC .... B23C 5/10; B23C 5/12; B23C 5/14; B23C 2210/0492; B23C 2210/0407;
 (Continued)

(56) References Cited

U.S. PATENT DOCUMENTS 3,667,857 A * 6/1972 Shaner et al. .......... B23B 51/08
 408/230
3,913,196 A * 10/1975 Maday ................. B23D 61/003
 408/230
(Continued)

FOREIGN PATENT DOCUMENTS

DE 20 2017 101 382 U1 5/2017
WO 2011/157667 A1 12/2011
(Continued)

OTHER PUBLICATIONS

English translation of the International Preliminary Report on Patentability (Chapter I) (Application No. PCT/EP2020/060101), dated Oct. 21, 2021, 6 pages.
(Continued)

*Primary Examiner* — Nicole N Ramos
(74) *Attorney, Agent, or Firm* — BURR PATENT LAW, PLLC

(57) ABSTRACT

A milling tool for milling workpieces, having a shank which can be rotated about an axis of rotation and at least one milling portion arranged on the shank along the axis of rotation. The milling portion first and second cutters arranged on the circumference and extending substantially over the milling portion in the direction of the axis of rotation and next to one another and/or one behind another as viewed in the direction of rotation/circumferential direction. The first cutter is arranged at a first angle and the second cutter is arranged at a second angle with respect to the axis of rotation. The first angle is not equal to the second angle. A first chip receptacle for receiving a chip of the workpiece that has been cut off is arranged at least between the first and the second cutter.

12 Claims, 3 Drawing Sheets

(58) Field of Classification Search
CPC ...... B23C 2210/0485; B23C 2210/086; B23C 2210/543; B23C 2210/12; B23C 2210/486; B23C 2226/27; B23C 2226/37
See application file for complete search history.

(56) References Cited

U.S. PATENT DOCUMENTS

| | | | | |
|---|---|---|---|---|
| 4,227,837 | A * | 10/1980 | Yodoshi | B23C 5/10 407/53 |
| 4,395,167 | A * | 7/1983 | Maternus | B23B 51/08 408/54 |
| 4,572,714 | A * | 2/1986 | Suzuki | B23B 51/02 407/53 |
| 4,990,035 | A * | 2/1991 | Scheuch | B23C 5/10 407/30 |
| 7,204,663 | B2 * | 4/2007 | Dov | B23C 5/10 407/56 |
| 7,770,276 | B2 * | 8/2010 | Christ, Jr. | B23P 9/025 29/90.01 |
| 8,562,261 | B2 * | 10/2013 | Oka | B23C 5/10 407/54 |
| 11,440,108 | B2 * | 9/2022 | Tsukihara | C23C 28/046 |
| 11,458,552 | B2 * | 10/2022 | Takatake | B23C 5/10 |
| 11,642,729 | B2 * | 5/2023 | Waki | B23C 5/10 409/131 |
| 2012/0051863 | A1 * | 3/2012 | Craig | B23C 5/10 408/230 |
| 2013/0058734 | A1 * | 3/2013 | Volokh | B23B 51/08 408/223 |
| 2013/0136548 | A1 * | 5/2013 | Takahashi | B23C 5/165 407/54 |
| 2015/0147127 | A1 * | 5/2015 | Shpigelman | B23C 5/10 407/54 |
| 2017/0216936 | A1 * | 8/2017 | Dodds | B23C 5/10 |
| 2020/0001379 | A1 | 1/2020 | Netzer | |

FOREIGN PATENT DOCUMENTS

WO 2013/160692 A1 10/2013
WO 2017/134011 A1 8/2017

OTHER PUBLICATIONS

International Search Report and Written Opinion (Application No. PCT/EP2020/060101) dated Jul. 2, 2020 (with English translation).

* cited by examiner

MILLING TOOL FOR MILLING WORKPIECES

CROSS REFERENCE TO RELATED APPLICATIONS

This application is a continuation of International Application No. PCT/EP2020/060101 filed Apr. 8, 2020, which designated the United States, and claims the benefit under 35 USC § 119(a)-(d) of European Application No. 19168891.0 filed Apr. 12, 2019, the entireties of which are incorporated herein by reference.

FIELD OF THE INVENTION

The present invention relates to a milling tool for milling workpieces.

BACKGROUND OF THE INVENTION

A variety of milling tools are already known, e.g. from DE 20 2017 101 382 U1, which, in addition to common materials such as various metals or "simple" plastics, also make it possible to process special materials, for example, to process fiber-containing materials such as carbon-fiber-reinforced plastics, glass-fiber-reinforced plastics, etc.

Carbon-fiber-reinforced plastic (CFRP) is a composite material in which carbon fibers are embedded in a plastic matrix. The matrix serves to connect the fibers and to fill the intermediate spaces. By contrast, glass-fiber-reinforced plastic, or GFRP for short, is a fiber-plastic composite made of a plastic and glass fibers.

The basic body, or what is known as the shank, of the milling cutter usually has on an end portion one or more of what are known as main features, each of which is in the form of a (helical) depression/flute which faces the rotation volume taken up by the rotating milling tool. These so-called main features are each provided with a cutting edge as the main cutter and are referred to as what is termed a "T1" cutting flute/edge. The material of the workpiece that is removed during machining can optionally also be transported away via the helical depression/flute (as in the case of a conveying helix), and, therefore, it is respectively in the form of a chip receptacle and chip transporting flute. In the case of modern milling tools, in particular, in the case of what are known as roughing cutters, there are usually several, in particular four or more main features or what are known as main cutters (T1 cutting edges), which extend parallel to one another and usually respectively helically around the axis of rotation of the shank or the basic body, i.e. are/rise at a first angle or "T1 angle" with respect to the axis of rotation, as it were.

By contrast to finishing cutters, roughing cutters can be recognized by the interrupted profile of the tool cutter, which enables the chip to be broken quickly and is, therefore, often not used to produce a uniform and high surface quality. These, therefore, often also have a chip geometry, over which the removed chip flows and which is referred to as what is termed a "T2" chip breaker flute. This profile or these chip geometries, like the main cutters, are often oriented in a helical or angled manner with respect to the axis of rotation, i.e. are/rise at a "T2 angle" with respect to the axis of rotation, as it were.

The aim of profiling the roughing cutter is to achieve in each case the shortest possible chipping behavior of the material removed; although this promotes vibrations and thus poorer surface quality, it provides other significant advantages compared to long-chipping behavior—especially significantly better chip removal. On account of the good chip volume removal rate, roughing milling tools are exceptionally suitable for procedures in which it is imperative e.g. to remove material as effectively and quickly as possible in one procedure, except for a finishing amount, in particular, prior to or without subsequent finishing, and when particularly high dimensional accuracy and surface quality are not necessary.

In the case of fiber-containing or fiber-reinforced materials, however, it is particularly disadvantageous that the existing milling tools, in particular roughing cutters, generate pronounced burr formation, in particular, with fiber ends protruding from the composite or the matrix. In that case, this burr or these fiber ends have to be reworked or ground off accordingly in most applications, this correspondingly involving economic and temporal outlay.

SUMMARY OF THE INVENTION

The object of the present invention, by contrast, is to propose a milling tool which at least partially improves the disadvantages of the prior art, in particular, reduces or even completely prevents burr formation, specifically also in the case of fiber-containing or fiber-reinforced materials.

Accordingly, a milling tool according to the present invention is distinguished in that the first angle is not equal to the second angle. This means that e.g. in the case of at least two helical cutters or what are known as main cutters, their alignment and/or the first angle of the first (main) cutter, i.e. the first "T1 angle" within the meaning of the present invention, and the second angle of the second (main) cutter, i.e. the second "T1 angle" within the meaning of the present invention, is/are unequal or is/are different/differ with respect to the axis of rotation. In the case of e.g. four so-called "main cutters" or "T1 cutters" or "T1 edges", it is possible, for example, for two so-called "first cutters" or helices to each be arranged/aligned at a first angle and the other two so-called "second cutters" or helices to be arranged/aligned at a different, i.e. "second angle", wherein according to the present invention these angles are different or unequal. According to the present invention, it is also possible for all four angles, i.e. "T1 angles" within the meaning of the present invention, of these four main cutters or "T1 cutting edges" to be designed unequally/differently.

Using this measure, it has surprisingly been demonstrated that, in comparison to the prior art, this makes it possible for primarily burr formation to be significantly reduced or completely eliminated under certain operating conditions. Primarily in the case of fiber-containing or fiber-reinforced materials, a reduction in or complete elimination/avoidance of fibers or fiber ends protruding/projecting from the matrix or the composite can be achieved. This makes it possible to completely or at least partially omit further reworking. This is of great advantage e.g. specifically also when milling, or processing by milling, electronic circuit boards or circuit boards or the like made of fiber-containing or fiber-reinforced material. Accordingly, the temporal and economic outlay involved in milling, or processing by milling, corresponding workpieces can be considerably reduced.

The different angles of the main cutters or "T1 cutting edges" moreover constitute a complete departure from the decades- or centuries-old practice of using angles of the main cutters or "T1 cutting edges" that are always identical. Thus, it has been known to date for all milling tools to always have identical angles of all the helices or main cutters/"T1 flutes", among other things in the form of singleor multiple-turn helices, such as double helix milling cutters with two chip transport flutes or what are known as "T1 flutes", which are aligned in parallel, within the meaning of the present invention. Even in the case of the existing milling tools, in which the angle of the main cutters or "T1 cutting edges" was equal to zero, i.e. parallel to the axis of rotation, all of the main cutters or "T1 cutting edges" were always parallel to the axis of rotation and thus equal or identical. The present invention thus stands in stark contrast to this existing basic principle of the same angle in milling tools.

In a particular refinement of the present invention, with respect to the axis of rotation the first angle is a positive angle, in particular an acute angle, and the second angle is a negative angle, in particular an acute angle, and, therefore, in particular, the first cutter is in the form of a right-handed cutting helix and the second cutter is in the form of a left-handed cutting helix. This has the effect that, for example, when milling, or processing by milling, fiber-containing or fiber-reinforced workpieces the first cutter, in particular, right-handed cutter/cutting edge, adjusts/bends the fibers or fiber ends in a first direction or subjects them to force/pressure, and the second cutter, in particular, left-handed cutter/cutting edge, adjusts/bends the fibers or fiber ends in a second direction, which is opposite the first direction, or subjects them to force/pressure. The workpiece vibrations are also reduced in this case, since the milling tool advantageously "spirals up/down", so to speak, i.e. has cutters or cutting helices which have spirals in opposite directions/are aligned in opposite directions.

Accordingly, the fibers or fiber ends are advantageously broken off or cut off and thus removed. This particularly effectively reduces or prevents burr formation and primarily a burr made of fibers/fiber ends projecting or protruding from the composite or the matrix.

As an alternative or in combination with the abovementioned variant of the present invention with helices in opposite directions, according to the present invention, it is also conceivable to provide different or unequal magnitudes of the first angle and the second angle. This means that e.g. the milling tool or the milling portion can be designed at least partially e.g. as a multiple or double helix with main cutters or T1 cutters/cutting edges which have different pitches. The distance between the cutting edges in the direction of the longitudinal axis/axis of rotation of the milling tool or milling portion is correspondingly changed or reduced.

The magnitude of the first angle is preferably equal to the magnitude of the second angle with respect to the axis of rotation. This makes it possible to reduce vibrations or reverberations of the milling tool and/or the workpiece, this having a positive effect on the processing quality and/or processing speed.

Advantageously, it is at least the case that a second chip receptacle, in particular chip flute, is arranged between two first cutters, and/or a third chip holder, in particular chip flute, is arranged between two second cutters. Thus, at least two first cutters are arranged next to one another in the direction of rotation or circumferential direction of the milling tool and have two equal or identical so-called first angles or "T1 angles" within the meaning of the present invention. There are then advantageously arranged in the direction of rotation or circumferential direction, in addition to these at least two cutters/cutting edges with the same first angle, at least one or two second cutters or cutting edges with what is known as a second angle or second "T1 angle", wherein according to the present invention the first and second angles or "T1 angles" are unequal or different, e.g. have a positive or right-handed alignment on the one hand and a negative or left-handed alignment on the other hand. This has an advantageous or stabilizing effect on the processing by milling.

In one preferred variant of the present invention, at least a first and a second milling segment are provided in the direction of rotation or circumferential direction, wherein the first milling segment has the first cutter(s) and the second milling segment has the second cutter(s). This additionally improves the processing of the workpiece and/or reduces vibrations during the processing and increases the processing quality. The producibility or the shaping of the cutters, cutting flutes and chip channels is also improved.

At least one fourth chip receptacle, in particular, chip flute or longitudinal flute, is preferably arranged between the first and the second milling segment. In this way it is advantageously the case that on the one hand the abovementioned segments are separated from one another more clearly by this chip flute/longitudinal flute, this in turn having an advantageous effect during milling with respect to vibrations, etc. On the other hand, the production or manufacture of the milling tool according to the present invention is improved, in particular, also intersections or disadvantageous formations in the transition or boundary region of two abovementioned segments and/or of two main cutters with unequal angles according to the present invention.

In addition, by means of the fourth chip receptacle transporting the generated chips away during the milling is improved and/or burrs, in particular, protruding fibers/fiber ends of the workpiece, are given "space" and/or time to "assemble" in the fourth chip receptacle or flute, so that they can then be advantageously separated or removed from the following, differently aligned cutter or cutting edge. This in turn improves the elimination or reduction of a burr, this having an additional positive effect with respect to corresponding reworking.

For example, the first chip receptacle is designed as the second or third or fourth chip receptacle. This means that the second or third or fourth chip receptacle forms the main cutter or the cutting edge, i.e. what is known as the "T1 cutting flute", and is correspondingly aligned with the first and/or the second angle according to the present invention. This is important with regard to the different variants which are advantageous according to the present invention.

In one advantageous embodiment of the present invention, provided transversely to the first and/or second cutter is at least a fifth chip receptacle, in particular, a chip flute or what is known as a "T2 chip breaker flute", which in particular interrupts the course of the corresponding cutter and/or constitutes a recess in the corresponding cutter. This makes it possible to bring about advantageously improved chip formation and chip removal, since with this the chips are only very short. This fifth chip receptacle, in particular, a chip flute or what is known as a "T2 chip breaker flute", effectively prevents the formation of long chips, which possibly adversely affect or disrupt the milling process.

Profiling of the lateral surface of the shank and/or milling portion and/or the cutter(s) and/or the cutting edge(s) can also be implemented. The latter can further improve the reduction or prevention of burr formation. Thus, it is possible to achieve a particularly pronounced reduction or complete elimination/avoidance of fibers or fiber ends projecting/protruding from the matrix or the composite, specifically in the case of fiber-containing or fiber-reinforced materials. This makes it possible to completely or at least partially omit further reworking. Accordingly, the temporal and economic outlay involved in milling, or processing by milling, corresponding workpieces can be reduced in a particular way.

It is advantageously the case that with respect to the axis of rotation the fifth chip receptacle is arranged at a third angle, in particular, at an obtuse angle with respect to the longitudinal axis or axis of rotation of the milling tool, with the result that the fifth chip receptacle is aligned from an end region of the milling portion toward the shank as viewed counter to the direction of rotation. This measure advantageously has the effect that a chip generated by means of the cutter from the front end region of the tool in the direction of the rear region or toward the fixing region of the tool, i.e. at which the milling tool is clamped into or fixed on the milling machine or machine tool, such as a CNC machine or the like. This effectively prevents the workpiece and/or tool from being adversely affected by a disadvantageous accumulation of chips in the processing area.

With respect to the axis of rotation, the fourth chip receptacle is preferably arranged at a fourth angle and/or parallel to the axis of rotation. It is precisely the parallel alignment of the fourth chip receptacle that enables advantageous manufacture and/or clear segmentation of the abovementioned segments; in this respect in particular four segments or quarter-circle segments are advantageous.

Advantageously, at least the first cutter has a first cutting edge/helix, which is interrupted multiple times by the fifth chip receptacle, and, therefore, the first cutting edge has multiple first edge portions, and/or at least the second cutter has a second cutting edge/helix, which is interrupted multiple times by the fifth chip receptacle, and, therefore, the second cutting edge has multiple second edge portions. This makes it possible to improve chip removal and/or the transporting away of chips and/or reduce or prevent burr formation, in particular, fiber-containing or fiber-reinforced materials fibers or fiber ends projecting or protruding from the matrix or the composite can be advantageously eliminated thereby.

In one advantageous variant of the present invention, the first cutter and/or first cutting edge and/or the second cutter and/or second cutting edge and/or first edge portions and/or second edge portions are in the form of a section of a helical line or helix. This measure also improves chip removal or the transporting away of chips and/or reduces or prevents burr formation, in particular, fiber-containing or fiber-reinforced materials.

BRIEF DESCRIPTION OF THE DRAWINGS

An exemplary embodiment of the present invention is illustrated in the drawing and explained in more detail below with reference to the figures.

DETAILED DESCRIPTION OF THE INVENTION

Figure 1:
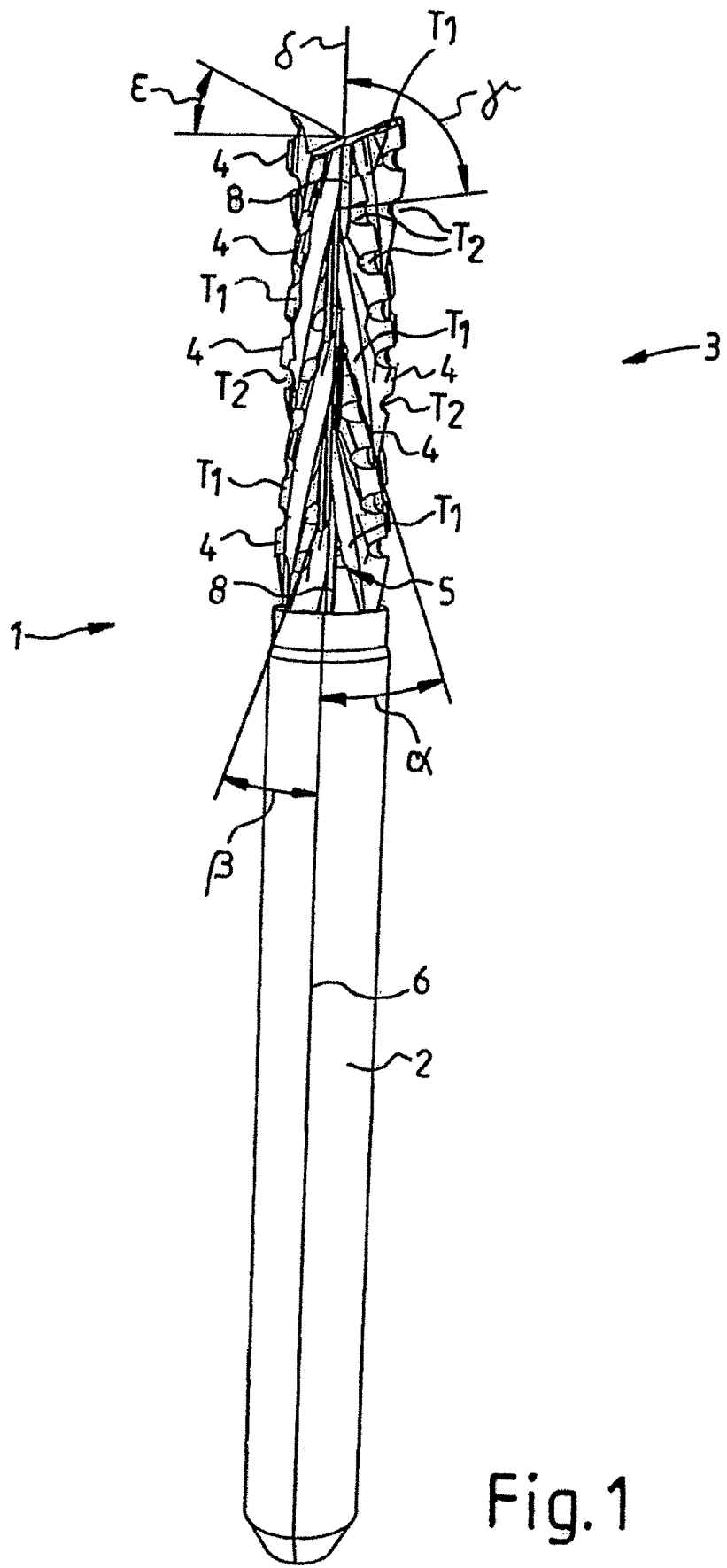
FIG. 1 shows a schematic side view of a milling tool according to the present invention.

FIG. 1 schematically illustrates a milling tool 1 according to the present invention having a shank 2 that can be clamped into a machine tool and having a milling portion 3. The milling portion 3 comprises multiple main features or main cutters 4, i.e. what are known as "T1 main cutters", each having multiple cutting edges/helices or cutting-edge portions which are interrupted (multiple times) by one or more so-called "T2" chip breaker flutes. The main cutter 4 is usually also referred to as what is termed a "T1" cutting flute or T1 cutting edge. These main cutters 4 or T1 cutting edges 4 are each formed by means of a helical depression/flute 5 which is arranged in front of the respective edge 4 in the direction of rotation.

In FIG. 1, it is made clear that, according to the present invention and with respect to the axis of rotation 6 or longitudinal axis 6 of the milling tool 1, a first cutter 4 with a first angle α (alpha, e.g. approx. 20°+/−20° and a second cutter 4 with a second angle β (beta, e.g. approx. 20°+/−20° are provided. Thus, here the first cutter 4 or first main cutter 4 forms a left-handed helix which is aligned at the angle α in relation to the axis of rotation 6, and the second cutter 4 or second main cutter 4 forms a right-handed helix which is aligned at the angle β in relation to the axis of rotation 6.

Figure 2:
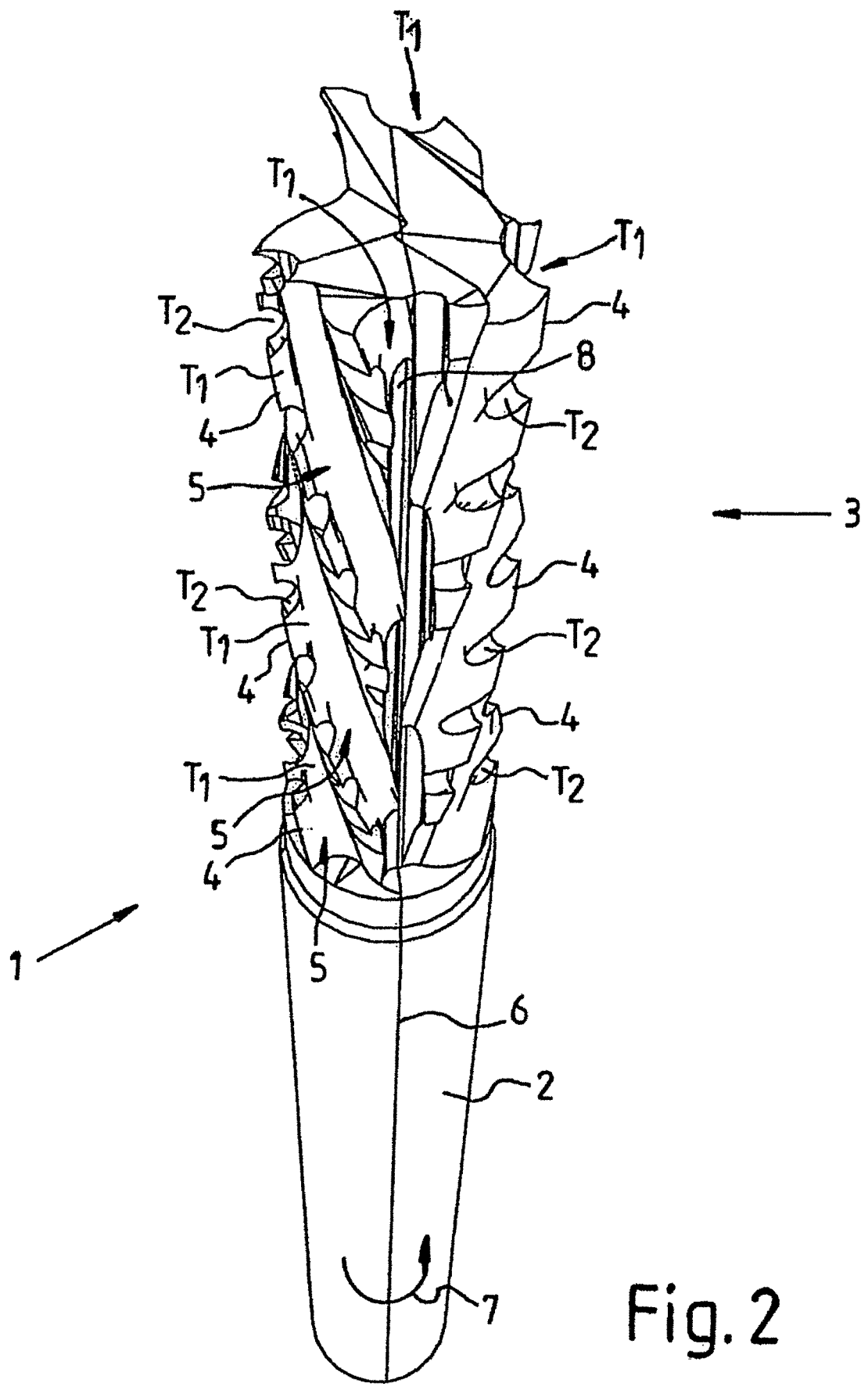
FIG. 2 is a schematic perspective view of the milling tool according to FIG. 1.

The first and the second cutter 4 or main cutter 4 are, however, both aligned/designed for a right-handed mode of operation of the milling tool. This is very particularly also made clear in FIG. 2 and primarily in FIG. 3. It can be seen here that the cutters 4 or cutting edges 4 are each aligned in a (right-handed) direction of rotation 7 in order to remove chips from the workpiece.

The chips, which are not illustrated in more detail, are advantageously transported away on the one hand respectively by means of the flute 5 or "T1" cutting flute. A chip breaker flute T2 or T2 flute is advantageously likewise in the form of a helix and aligned at an angle γ (gamma, e.g. approx. 97°+/−20°) in relation to the axis of rotation 6. Thus, the windings of the single T2 flute or its T2 recesses are right-handed or rise right-handed around the axis of rotation 6 at an angle of approx. 97°, as is depicted by way of example in FIG. 1.

By contrast, according to the present embodiment variant, advantageously provided here are four segments I to IV (cf. FIG. 3), in each of which multiple, here preferably in each case three main cutters 4 or main features/T1 flutes are provided. In the adjacent segments I-IV, first cutters 4 and second cutters 4 alternate, i.e. segments I to IV with right-handed and then with left-handed main cutters 4 or T1 main features/T1 helices respectively alternate in the direction of rotation 7 or on the circumference.

As is made clear in the figures, provided between the segments I to IV is a respective recess 8 or longitudinal flute 8, which thereby delimit or spatially define the segments I to IV, as it were. The longitudinal groove 8 depicted is aligned substantially parallel to the axis of rotation 6 or longitudinal axis 6, with the result that the segments I to IV extend in the form of straight cylinder quarters along the axis of rotation 6.

As an alternative to this, the longitudinal flutes 8 or recesses 8 may also be in the form of a helix, for example, a right-handed helix with an angle delta which advantageously corresponds to the angle of the right-handed cutter 4 or T1 main cutter. In that case, this angle delta could have, for example, δ=approx. 20°+/−20° and would correspond to the angle β in FIG. 1, wherein however the left-handed helix could optionally be furthermore formed at the angle α=approx. 20°.

By contrast, use has been made to date exclusively of milling tools in which the main cutters or T1 main features are implemented so as to be wound around the axis of rotation in the same direction or in the same way and to have the same angles. The exemplary embodiment illustrated, however, has different angles α and β which, although they have a magnitude, i.e. in the illustrated variant of e.g. approx. 20°+/−20°, are unequal or different in terms of the mathematical sign or in terms of the alignment with respect to the axis of rotation 6. In this way, protruding fiber ends or burrs are effectively avoided or at least minimized in an advantageous manner, specifically in the case of fiber-containing materials.

Figure 3:
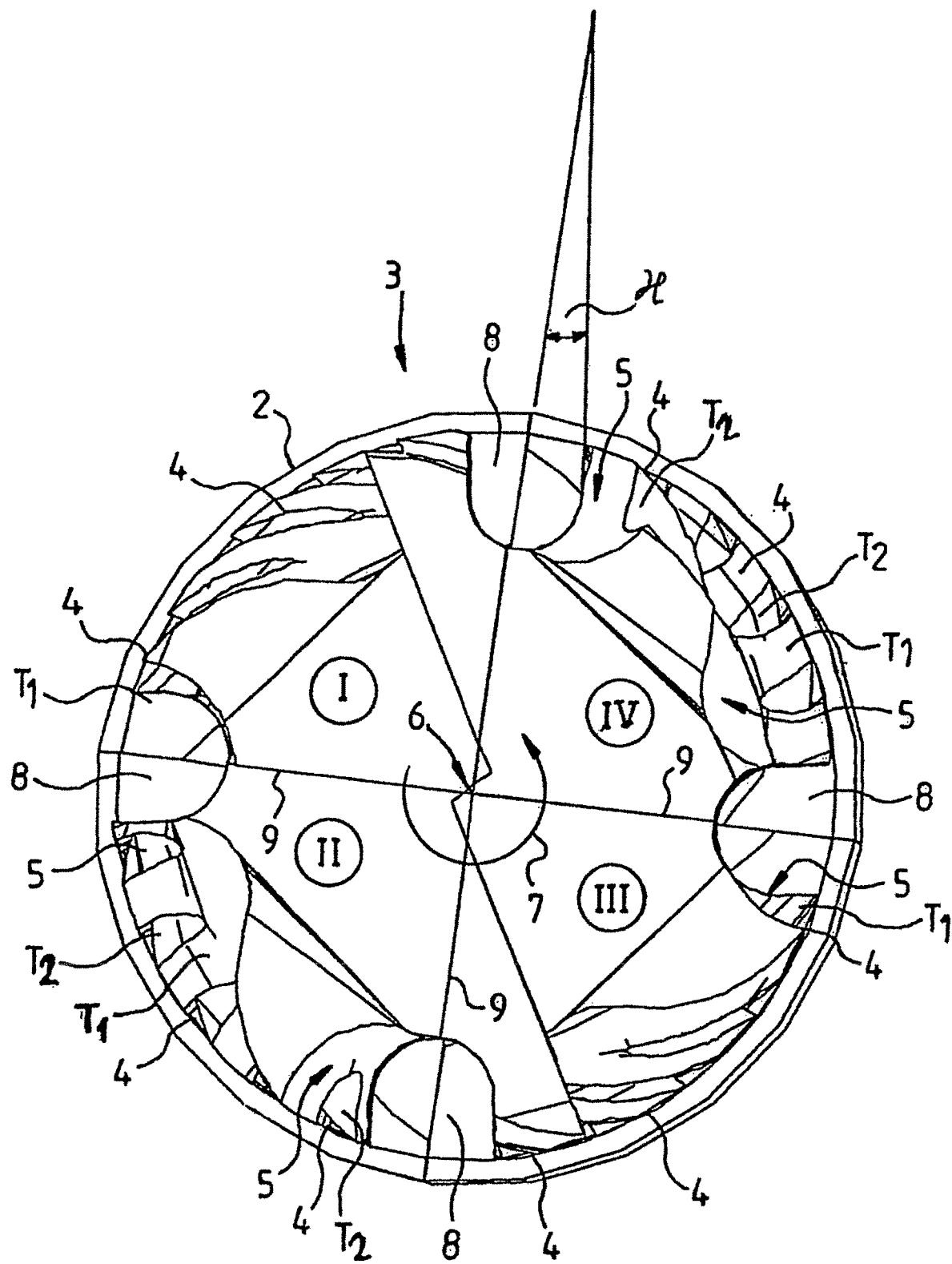
FIG. 3 shows a schematic plan view of the milling tool according to FIG. 1.

As is made clear in turn primarily in FIG. 3, the third chip flute 8 is advantageously provided between two segments I-IV in each case. This allows the chips to be transported away, as it were. Essentially, during the manufacture of the milling tool 1, by virtue of this flute 8, in particular, the main cutters 4 or T1 main features, disadvantageous protrusions or edges in the transition region of the first and second cutters 4, which run in opposite directions, become advantageously avoidable. As already set out above, in the present exemplary embodiment these four third chip flutes 8 or longitudinal flutes 8 are aligned parallel to the axis of rotation 6 and thus at the angle δ=0° (delta) (cf. FIG. 1).

Cutters or surfaces, for example, at the angle ε (epsilon, e.g. approx. 20°+/−20°) are provided on the end face of the milling tool 1 or the milling portion 3, such that end-face milling can also be implemented, e.g. for the purpose of what is known as "dipping" into a workpiece (cf. FIG. 1). This end or this tip of the tool may, however, also be shaped/designed in almost any desired way, i.e. may be designed not only as depicted with a V-shaped cross section, but also with a straight/flat or (semi-) circular or rounded cross section or else with a protective bevel or the like.

In addition, it can be seen in FIG. 3 that the main cutters 4 or cutting flutes 5 are each arranged at an angle κ (kappa, e.g. approx. 8°+/−5°) with respect to a longitudinal center plane 9, in order to generate an advantageous rake angle.

The milling tool 1 according to the invention which is illustrated in the figures is a geometrically relatively complex tool which here advantageously cuts in a right-handed manner or has the main cutters 4 aligned in a right-handed manner, but as what are termed T1 main features comprises not only right-handed main cutters 4 or main cutters with a right-handed helix, but also left-handed main cutters 4 or main cutters with a left-handed helix, which are arranged separately in the circumferential direction or separately in defined segments I to IV. This has the advantageous effect that, during the processing of fiber-containing material, fibers or fiber ends are respectively deflected from a segment I-IV in the one direction and deflected from the following, adjacent segment I-IV in the other, opposite direction and thus are severed in an advantageous manner. This prevents or reduces burr formation and/or protruding fiber ends in a particular way. This makes it possible to omit complex or more cost-intensive reworking in many usage situations.

LIST OF REFERENCE SIGNS

1 Milling tool
2 Shank
3 Milling portion
4 Main cutter
5 Flute
6 Axis of rotation/Longitudinal axis
7 Direction of rotation
8 Longitudinal flute
α Angle
β Angle
γ Angle
δ Angle
ε Angle
κ Angle
T1 Main feature
T2 Secondary feature

The invention claimed is:

1. A milling tool for milling workpieces, comprising:
a shank that is rotatable about an axis of rotation; and
at least one milling portion arranged on the shank along the axis of rotation,
wherein the milling portion comprises at least one first cutter arranged on a circumference of the shank, and at least one second cutter arranged on the circumference of the shank,
wherein the at least one first cutter and the at least one second cutter extend substantially over the milling portion in a direction of the axis of rotation, and are arranged next to one another and/or one behind another as viewed in the direction of the axis of rotation/a circumferential direction,
wherein the at least one first cutter is arranged at a first angle (α) with respect to the axis of rotation, and the at least one second cutter is arranged at a second angle (β) with respect to the axis of rotation,
wherein with respect to the axis of rotation, the first angle (α) is a positive angle, and the second angle (β) is a negative angle,
wherein a numerical size value of the first angle (α) is equal to a numerical size value of the second angle (β),
wherein at least one first chip receptacle, comprising a helical flute for receiving a chip of a workpiece that has been cut off, is arranged at least between the at least one first cutter and the at least one second cutter,
wherein two of the at least one first cutter are provided, and a second chip receptacle is arranged between the two first cutters, and/or wherein two of the at least one second cutter are provided, and a third chip receptacle is arranged between the two second cutters,
wherein at least a first milling segment and a second milling segment are provided in the direction of the axis of rotation/the circumferential direction,
wherein the first milling segment has the two first cutters, and the second milling segment has the two second cutters,
wherein at least one fourth chip receptacle arranged between the first milling segment and the second milling segment,
wherein at least one fifth chip receptacle is provided transversely with respect to the two first cutters and/or the two second cutters, and
wherein the at least one fifth chip receptacle intersects a path of the two first cutters and/or the two second cutters, and/or wherein the fifth chip receptacle constitutes a recess in respective ones of the two first cutters and/or the two second cutters.

2. The milling tool as claimed in claim 1, wherein the at least one first cutter is a right-handed cutting helix, and the at least one second cutter is a left-handed cutting helix.

3. The milling tool as claimed in claim 1, wherein with respect to the axis of rotation, the fifth chip receptacle is arranged at a third angle, so that the fifth chip receptacle is aligned in the direction of the axis of rotation from an end region of the milling portion toward the shank when viewed in a direction that is counter to the direction of the axis of rotation.

4. The milling tool as claimed in claim 1, wherein, with respect to the direction of the axis of rotation, the fourth chip receptacle is arranged at a fourth angle with respect to the direction of the axis of rotation or parallel to the direction of the axis of rotation.

5. The milling tool as claimed in claim 1, wherein at least the two first cutters have first cutting edges that is are intersected multiple times by the fifth chip receptacle, so that the first cutting edges have a plurality of first edge portions.

6. The milling tool as claimed in claim 1, wherein at least the two second cutters have second cutting edges that are intersected multiple times by the fifth chip receptacle, so that the second cutting edges have a plurality of second edge portions.

7. The milling tool as claimed in claim 5, wherein the two first cutters, and/or the first cutting edges, and/or the first edge portions define a section of a helical line.

8. Milling workpieces, comprising at least partially fiber-containing materials, made using the milling tool as claims in claim 1.

9. The milling tool according to claim 1, wherein the first and second angles are acute angles.

10. The milling tool according to claim 3, wherein the third angle is an obtuse angle.

11. The milling tool as claimed in claim 6, wherein the two second cutters, and/or the second cutting edges, and/or the second edge portions define a section of a helical line.

12. Milling workpieces, comprising carbon-fiber-containing or glass-fiber-containing plastics/composite materials, made using the milling tool as claimed in claim 1.

\* \* \* \* \*